United States Patent
Li et al.

(10) Patent No.: US 7,975,366 B2
(45) Date of Patent: Jul. 12, 2011

(54) METHOD OF MANUFACTURING A MAGNETIC WRITE HEAD MOLD FOR NECK HEIGHT EQUALIZATION

(75) Inventors: Donghong Li, Milpitas, CA (US); Yoshitaka Sasaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 844 days.

(21) Appl. No.: 12/002,160

(22) Filed: Dec. 14, 2007

(65) Prior Publication Data

US 2008/0096114 A1    Apr. 24, 2008

Related U.S. Application Data

(62) Division of application No. 11/146,583, filed on Jun. 7, 2005, now Pat. No. 7,313,863.

(51) Int. Cl.
*H04R 31/00* (2006.01)
*C23F 1/02* (2006.01)
(52) U.S. Cl. ......... 29/603.07; 216/39; 216/42; 427/404; 427/419.2
(58) Field of Classification Search ............... 29/603.07, 29/603.12; 216/39, 42, 66, 94; 427/404, 427/419.2
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 6,510,024 B2 | 1/2003 | Otsuka et al. | |
| 6,614,620 B2 | 9/2003 | Tagawa et al. | |
| 6,821,717 B2 * | 11/2004 | Lin et al. | 29/603.07 X |
| 6,854,175 B2 | 2/2005 | Sasaki | |
| 2002/0041465 A1 | 4/2002 | Sasaki | |
| 2004/0175596 A1 | 9/2004 | Inomata et al. | |

FOREIGN PATENT DOCUMENTS

JP    61162844 A  *  7/1986

* cited by examiner

*Primary Examiner* — A. Dexter Tugbang
(74) *Attorney, Agent, or Firm* — Saile Ackerman LLC; Stephen B. Ackerman

(57) ABSTRACT

A process to reduce the bevel angle in a mold used to form a write head is disclosed. First, tantalum is used instead of alumina for the yoke area. Then both the tantalum and the alumina areas are simultaneously subjected to reactive ion etching, leading to sloping sidewalls in the alumina area (write pole) while providing near vertical sidewalls in the tantalum (yoke) area. Consequently, the neck height is the same at the cavity floor as it is at the cavity top.

6 Claims, 7 Drawing Sheets

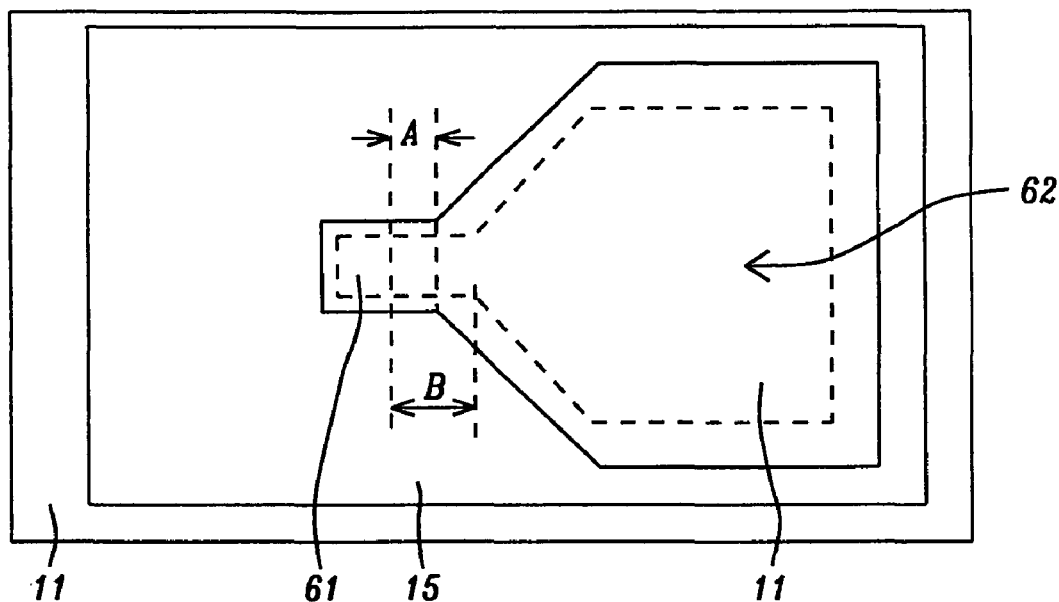
FIG. 1a – Prior Art

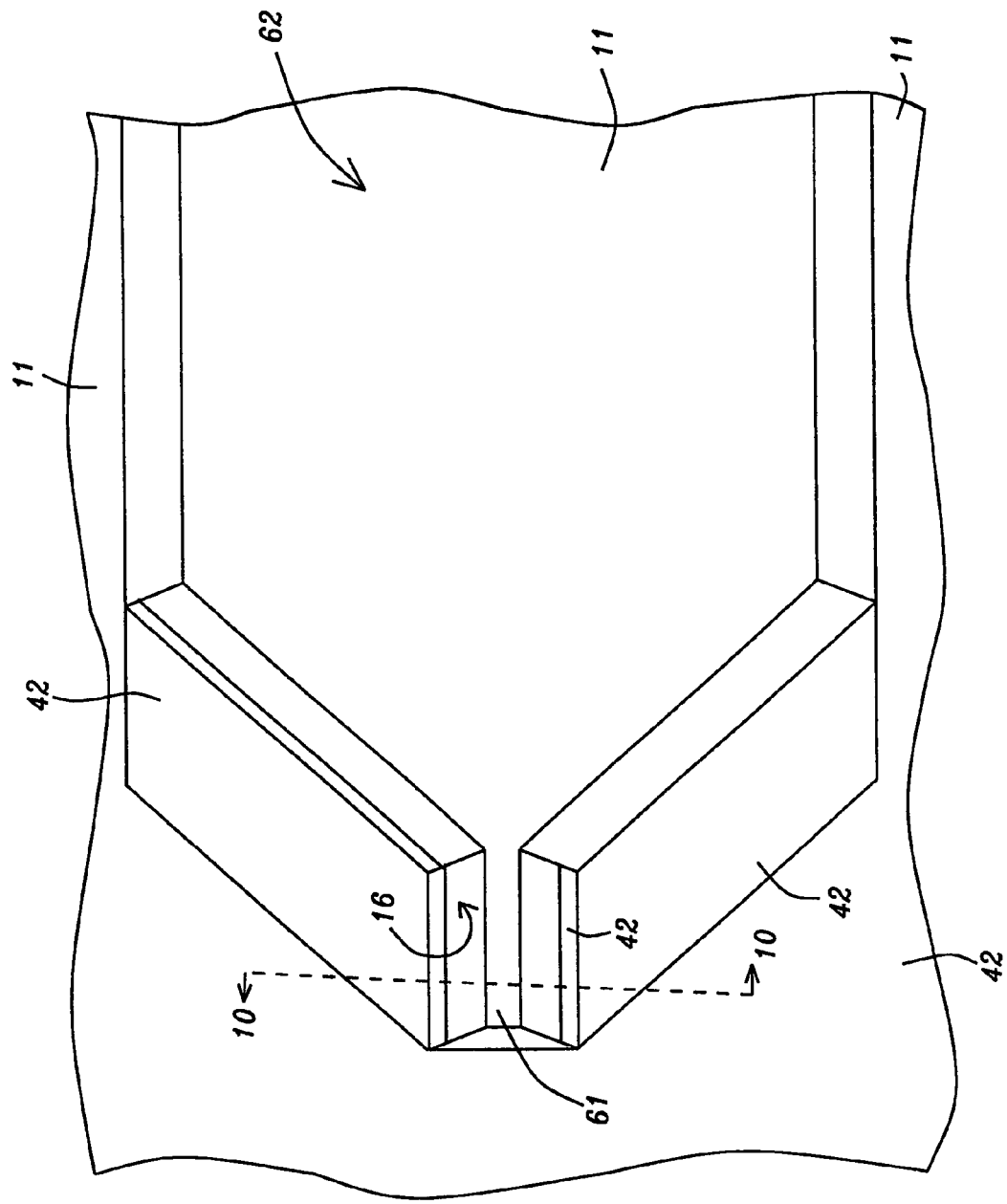
FIG. 1b – Prior Art

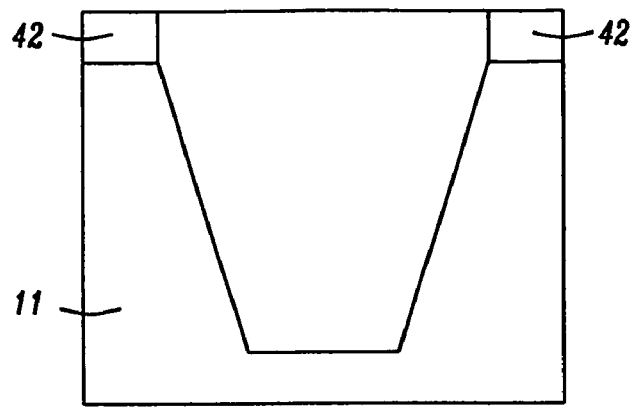
FIG. 1c - Prior Art
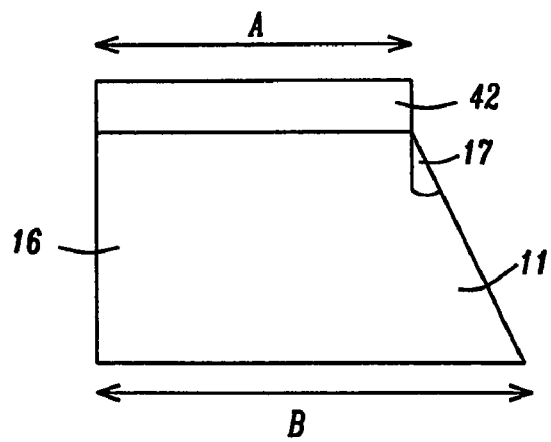
FIG. 1d - Prior Art
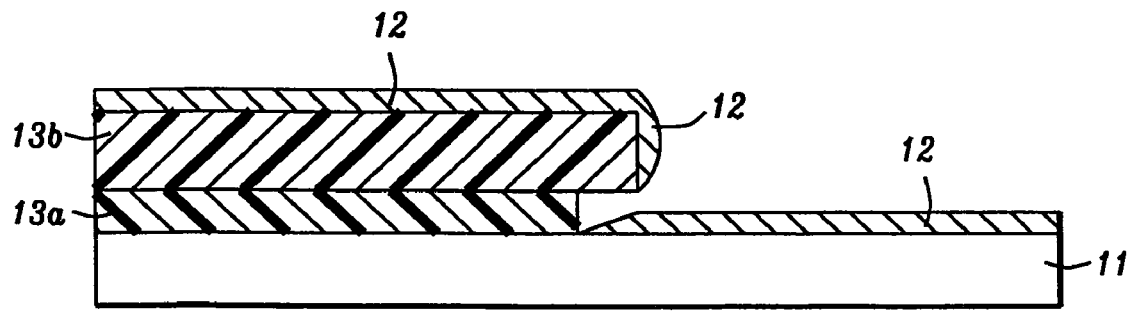
FIG. 2

METHOD OF MANUFACTURING A MAGNETIC WRITE HEAD MOLD FOR NECK HEIGHT EQUALIZATION

This is a divisional application of U.S. patent application Ser. No. 11/146,583, filed on Jun. 7, 2005, now U.S. Pat. No. 7,313,863 which is herein incorporated by reference in its entirety, and assigned to a common assignee.

FIELD OF THE INVENTION

The invention relates to the general field of magnetic disk recording with particular reference to formation of the write pole.

BACKGROUND OF THE INVENTION

For current cavity pole designs, RIE (Reactive Ion Etching) and $Al_2O_3$ are used to create the pole mold, including a bevel angle. One process phenomenon is that the bevel angle in the yoke area is greater than in the pole area (due to etch area differences). This, however, causes the NH (Neck Height) to be much longer at the bottom of the pole than at its top. Also, the magnetic volume at the flare point is significantly reduced. All of which will impact the head's writing performance.

FIGS. 1a-1d illustrate this problem. FIG. 1a is a plan view of a mold which will be used to form the write pole. Line 15 indicated the plane of the ABS (air bearing surface in the completed device). Neck height is the distance from the ABS to the flare FIG. 1b is an isometric view of FIG. 1a. Section cut 1c-1c corresponds to line 15 in FIG. 1a while layer 42 is a hard mask of tantalum that was used during RIE (reactive ion etching) to form the pole tip portion of mold area 61. FIG. 1d shows one of the sidewalls 16 in the tip area, illustrating how it slopes, at angle 17 (typically between about 7 and 12 degrees), at the flare point which results in the longer neck height B at the bottom of 61 relative to neck height A at the top.

This invention describes a new process to reduce the bevel angle in the yoke area while continuing to maintain the angle at the pole tip area, thereby resulting in a neck height that is the same at both levels. A routine search of the prior art was performed with the following references of interest being found:

U.S. Pat. No. 6,614,620 (Tagawa et al) describes using $Al_2O_3$ to etch the pole. In U.S. Pat. No. 6,510,024, Otsuka et al. disclose $Al_2O_3$ or other low etch rate material used to form the recording gap. U.S. Pat. No. 6,854,175 (Sasaki) shows that tantalum can be used in addition to alumina for the write gap layer while U.S. Pat. No. 6,504,675 (Shukh et al) discusses the slope angle of the pole sides.

U.S. Patent Application 2004/0175596 (Inomata et al) shows a tantalum protective layer on top of a stack including $Al_2O_3$. U.S. Patent Application 2002/0041465 (Sasaki) shows tantalum on alumina and RIE to form the pole. U.S. Pat. Nos. 4,672,493 (Schewe) and 4,656,546 (Mallory) disclose magnetic recording head pole designs.

SUMMARY OF THE INVENTION

It has been an object of at least one embodiment of the present invention to provide a method to form a cavity having inner walls of varying slope.

Another object of at least one embodiment of the present invention has been to provide a process to form a mold for use in the manufacture of a perpendicular magnetic pole write head.

These objects have been achieved by replacing the conventional alumina with tantalum in the yoke portion of the mold. When both the tantalum and the alumina areas are simultaneously subjected to reactive ion etching, sloping sidewalls are obtained in the alumina area (write pole portion) whereas the sidewalls are almost vertical in the tantalum (yoke) area.

BRIEF DESCRIPTION OF THE DRAWINGS

FIG. 1a is a plan view of a magnetic write pole mold of the prior art.

FIG. 1b is an isometric view of FIG. 1a.

FIG. 1c is an edge-on view of a sidewall in the pole tip area.

FIG. 1d is a cross-section made at the future site of the ABS.

FIG. 2 shows formation of a layer having a beveled edge as part of a liftoff process.

FIG. 8b is an isometric view of FIG. 8a.

DESCRIPTION OF THE PREFERRED EMBODIMENTS

Before cavity etching by RIE, tantalum is used in the yoke area instead of $Al_2O_3$, and also in the pole tip area. This is followed by the RIE process. Due to material etch property differences, the $Al_2O_3$ sidewalls will have the designed bevel angle, and the Ta sidewall will remain almost vertical. This is for NH (neck height) at the bottom of the pole to equal NH at the top of pole.

Compared with the existing cavity process that uses only $Al_2O_3$ for mold material, this invention uses two materials for RIE etching, $Al_2O_3$ at the pole tip and Ta at the yoke. Therefore, different bevel angles can be created for different portions. NH at the bottom of the pole will be the same as at the top of the pole, and the magnetic volume will be larger in the flare point area. There are three additional processes in order to deposit Ta.

One is a bi-layer photo liftoff process used in conjunction with sputtered Ta, second is deposition of $Al_2O_3$, and the third is a polishing step to make the surface flat.

With the existing cavity pole process, NH at the bottom of the pole is longer than at the top. The present invention makes NH at the bottom the same as at the top of the pole, and the magnetic volume is also increased.

Now follows a detailed description of the process of the present invention. This description will also make clear the structure of the present invention.

Referring now to FIG. 2 the process of the invention begins with the formation of liftoff mask 13a/13b on substrate 11 (of a material such as alumina). Both layers of the liftoff mask are photosensitive but layer 13a is easily dissolved while layer 13b is etch resistant. Tantalum layer 12 is then deposited to a thickness between about 2,000 and 3,000 Angstroms, using a process such as sputtering, chemical vapor deposition (CVD), or ion beam deposition, which allows the deposited tantalum to extend beneath the overhang (of 13b over 13a) so that the tantalum has a wedge shaped edge that slopes towards the substrate at an angle of about 45 degrees. Following liftoff of mask 13a/b, tantalum layer 12 will remain in the area within which the yoke portion of the write head will later be formed.

Figure 3A:
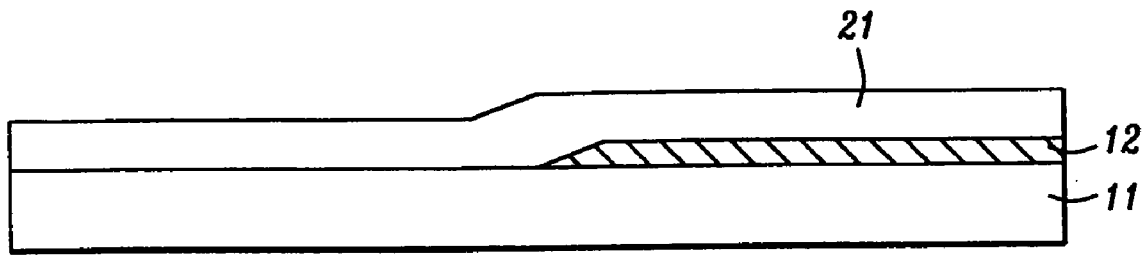
FIGS. 3a and 3b illustrate embedding the beveled edge of FIG. 2 in a layer.
Figure 3B:
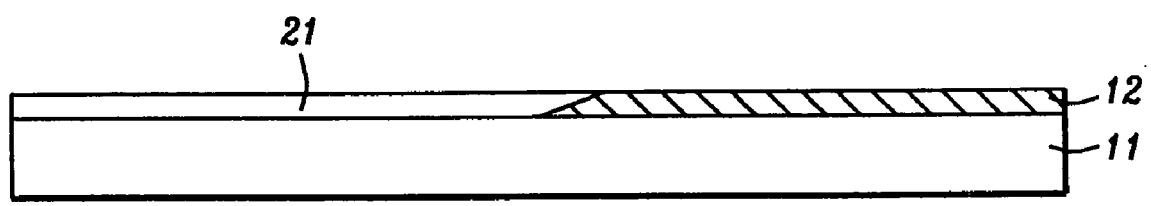
Figure 4:
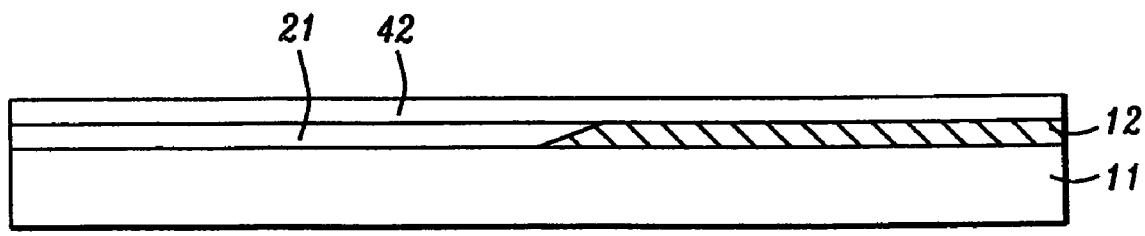
FIG. 4 shows a second layer over said embedded beveled edge layer.

Next, as seen in FIG. 3a, layer of alumina 21 is deposited on all exposed surfaces, to a thickness between about 3,000 and 4,000 Angstroms, following which the structure is planarized until tantalum layer 12 is just exposed, giving the structure the appearance illustrated in FIG. 3b. This is followed by the deposition of second tantalum layer 42, to a thickness between about 500 and 1,000 Angstroms, as shown in FIG. 4.

Figure 5:
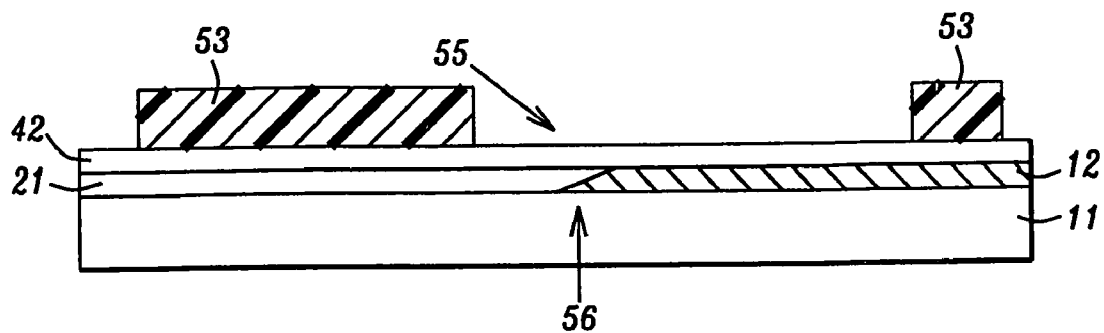
FIG. 5 is a cross-section of the mask used to etch the mold.
Figure 6:
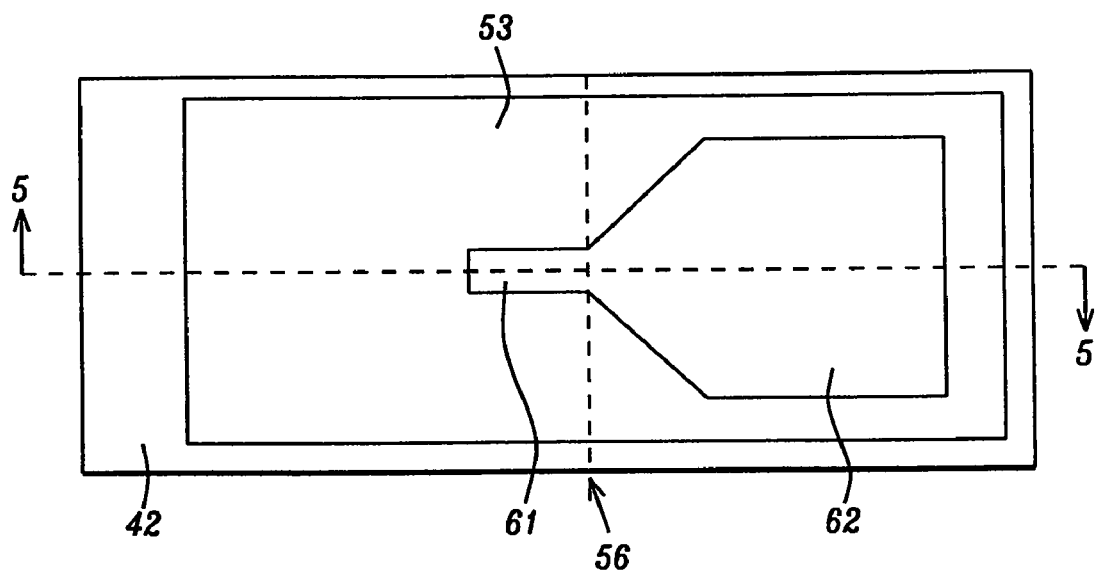
FIG. 6 is a plan view of the cross-section seen in FIG. 5.

Referring next to FIG. 5, photoresist layer 53 is deposited and patterned to form a mask that defines areas for the write pole and the yoke. The width of the write pole area is typically between about 0.15 and 0.25 microns while that of the yoke area (at its widest) is typically between about 10 and 15 microns. A key feature of the invention is that the flare point, where the narrow write pole first widens to become the yoke, is located directly over tantalum layer 12's sloping edge 56. This can be seen in FIG. 6 which is a plan view of the cross-section shown in FIG. 5, showing the relative positions of write pole 61 and yoke 62.

Now follows another key feature of the invention, namely the simultaneous etching, by means of a RIE process, of both the write pole and yoke areas. Our preferred RIE process has been source power of up to 1,200 W, chuck power of 40 W, at a pressure of 0.3 Pa for about 90 seconds. The chamber temperature was about 100% C and the etchants were $Cl_2$ at a flow rate of about 15 sccm, $BCl_3$ at a flow rate of about 80 sccm, and $CF_4$ at a flow rate of about 12 sccm. It should be noted that similar, related, RIE processes could also have been effectively used.

At the completion of RIE, cavity 61/62 is formed in the alumina and tantalum layers. Because of the different responses of the alumina and the tantalum layers to the RIE process, cavity portion 61 (for the write pole tip) is found to have sidewalls that slope at an angle of between about 7 and 12 degrees while cavity portion 62 has sidewalls that slope an angle of up to about 4 degrees.

Figure 7:
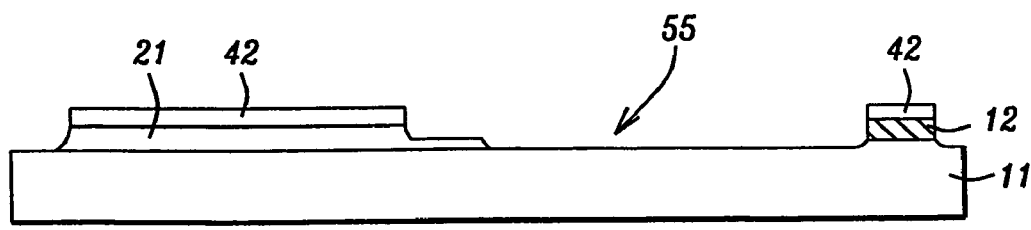
FIG. 7 shows the structure of FIG. 5 at the completion of etching.
Figure 8A:
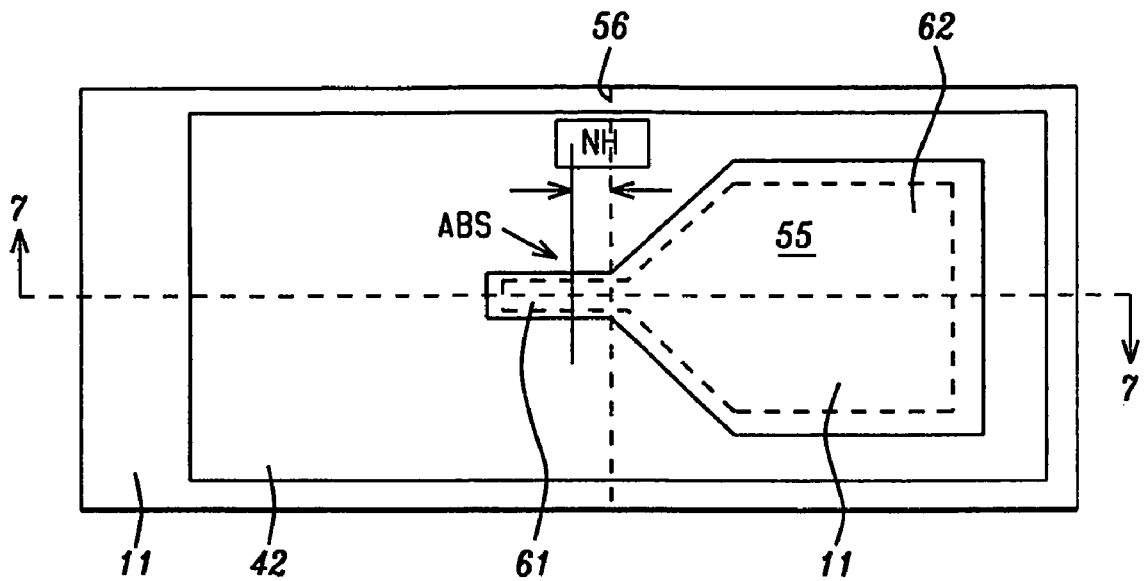
FIG. 8a shows the appearance of FIG. 6 when the latter is formed according to the process of the present invention. In particular, the neck height is the same at the top and the bottom of the write pole.

This difference in the slopes of the sidewalls in the two regions can be seen in FIG. 7, with layer 21 showing a significant slope while for layer 12 the slope is near vertical. FIG. 8a is a plan view of the section seen in FIG. seen in FIG. 7 while FIG. 8b is a partial isometric view similar to FIG. 1b, showing pole tip portion 61 (with sloping sidewalls) and yoke portion 62 (with steep sidewalls).

Figure 8B:
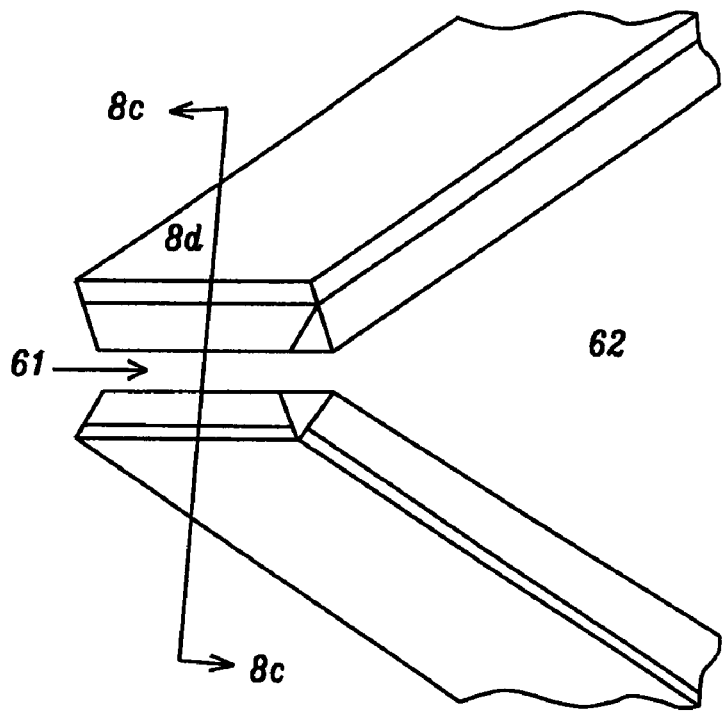
Figure 8C:
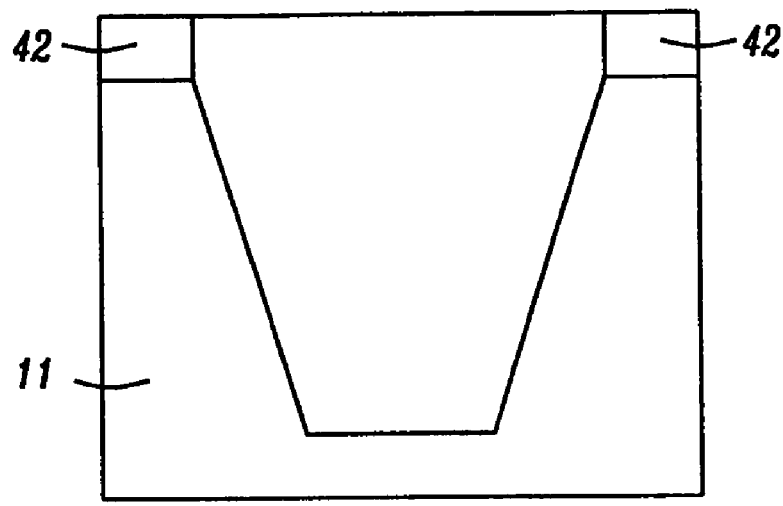
FIG. 8c is a cross-sections taken at the site of the future ABS.
Figure 8D:
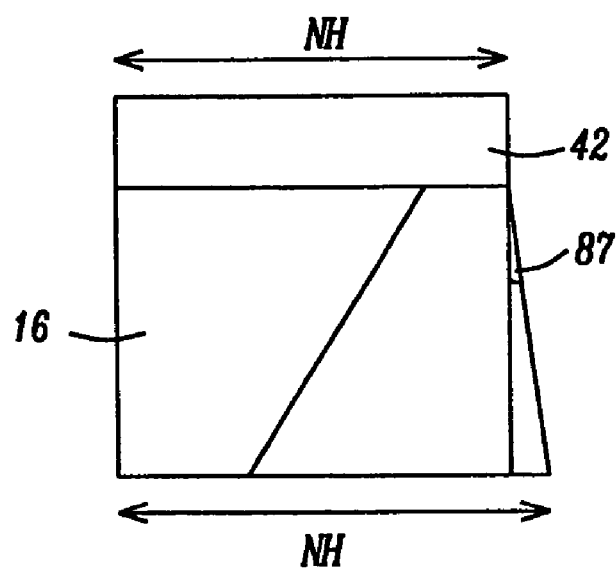
FIG. 8d is a view of part of the sidewall of the pole tip trench.

FIG. 8c is a cross-section taken at 8c-8c in FIG. 8b showing the afore-mentioned slope of the sidewalls at the site of the future ABS while FIG. 8d views the sidewall from inside the pole tip section where it can be seen that, due to the low value of etch angle 87, the neck height NH is essentially the same at the top as at the bottom.

What is claimed:

1. A process to form a mold for use in the manufacture of a magnetic component that includes a write pole, having an ABS, a neck height, and a yoke that is connected to said write pole at a flare point, comprising:

providing a liftoff mask on an alumina substrate and then depositing thereon a first layer of tantalum whereby, after said liftoff mask has lifted off, said first layer of tantalum covers an area within which said yoke is to be formed and has an edge that slopes towards said substrate at an angle of about 45 degrees;

depositing a layer of alumina on all exposed surfaces and then planarizing until said first tantalum layer is just exposed;

depositing a second layer of tantalum;

depositing and patterning a layer of photoresist to form a mask that defines areas for said write pole and yoke with said flare point being directly over said edge that slopes towards said substrate; and then, by means of reactive ion etching (RIE), etching all exposed surfaces under conditions such that a cavity is formed in the alumina and tantalum layers, said cavity having a floor and a top as well as sidewalls that slope at an angle of between about 7 and 12 degrees in the deposited alumina layer and at an angle of up to about 4 degrees in the second tantalum layer, whereby said neck height is the same at said cavity floor as at said cavity top.

2. The process recited in claim 1 wherein said first tantalum layer is deposited using a process selected from the group consisting of sputtering, ion beam deposition, and chemical vapor deposition.

3. The process recited in claim 1 wherein said first tantalum layer is deposited to a thickness between about 2,000 and 3,000 Angstroms.

4. The process recited in claim 1 wherein said alumina layer is deposited to a thickness between about 3,000 and 4,000 Angstroms.

5. The process recited in claim 1 wherein said second tantalum layer is deposited to a thickness between about 500 and 1,000 Angstroms.

6. The process recited in claim 1 wherein said RIE process further comprises:

for about 90 seconds, using a source power of up to 1,200 W, a chuck power of about 40 W, a pressure of about 0.3 Pa, a chamber temperature of about 100% C., and, as etchants, $Cl_2$ at a flow rate of about 15 sccm, $BCl_3$ at a flow rate of about 80 sccm, and $CF_4$ at a flow rate of about 12 sccm.

* * * * *